United States Patent [19] [11] Patent Number: 6,029,398
Sporer [45] Date of Patent: Feb. 29, 2000

[54] MULTI-COMPARTMENTALIZED PLANT CONTAINER

[76] Inventor: Michael B. Sporer, 807 Colesville Rd., Binghamton, N.Y. 13904

[21] Appl. No.: 09/019,029

[22] Filed: Feb. 5, 1998

[51] Int. Cl.[7] .................................................. A01G 31/02
[52] U.S. Cl. .................................. 47/65; 47/17; 248/329
[58] Field of Search .................................. 47/60, 61, 65, 47/66.1, 66.3, 66.4, 66.5, 66.6, 66.7, 67, 75, 901, 18, 19, 39, 45, 46, 47

[56] References Cited

U.S. PATENT DOCUMENTS

| | | | |
|---|---|---|---|
| 1,777,542 | 10/1930 | Baerman | 312/200 |
| 2,014,657 | 9/1935 | Marshall et al. | 47/19 |
| 3,066,445 | 12/1962 | D'Amico | 47/19 |
| 3,106,801 | 10/1963 | Risacher | 47/17 |
| 3,136,090 | 6/1964 | Carnwath | 47/19 |
| 4,244,145 | 1/1981 | Polacsek | 47/17 |
| 4,276,720 | 7/1981 | Lyon | 47/39 |
| 4,466,217 | 8/1984 | Shear | 47/1.01 R |
| 4,521,989 | 6/1985 | Meyer | 47/14 |
| 5,448,853 | 9/1995 | Harman | 47/60 |

*Primary Examiner*—Peter M. Poon
*Assistant Examiner*—Francis T. Palo
*Attorney, Agent, or Firm*—Salzman & Levy

[57] ABSTRACT

An integrated plant device is illustrated and described that has a multiplicity of compartments for storing plant propagating equipment, for storing gardening tools, and for storing plant flats. The compartmentalized plant device assembles into a transportable storage chest on wheels.

18 Claims, 4 Drawing Sheets

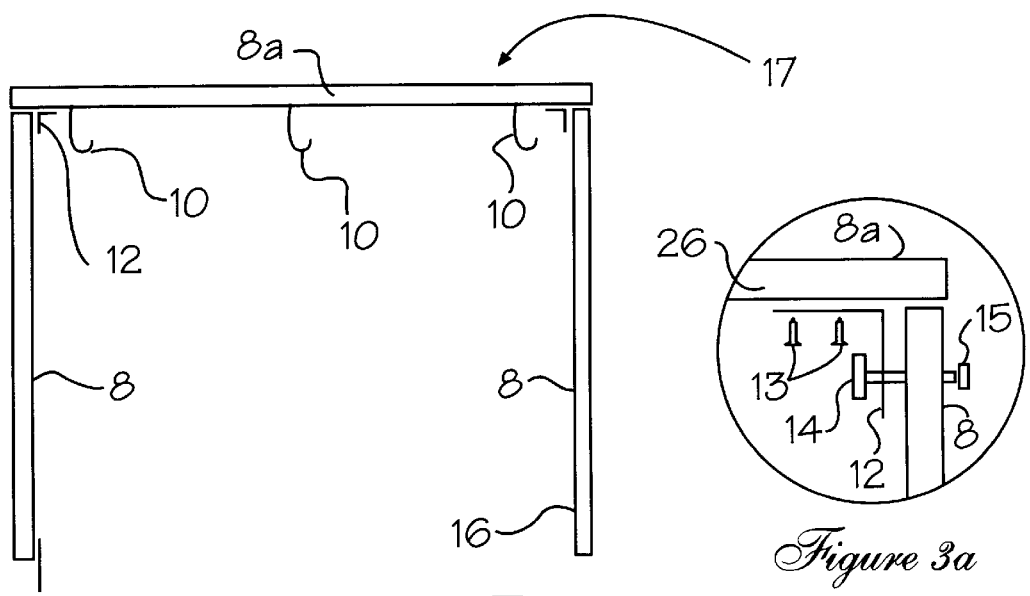
Figure 3
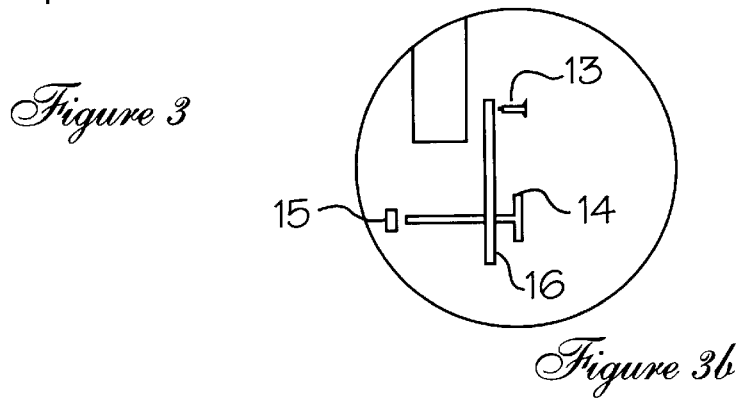
Figure 3a
Figure 3b
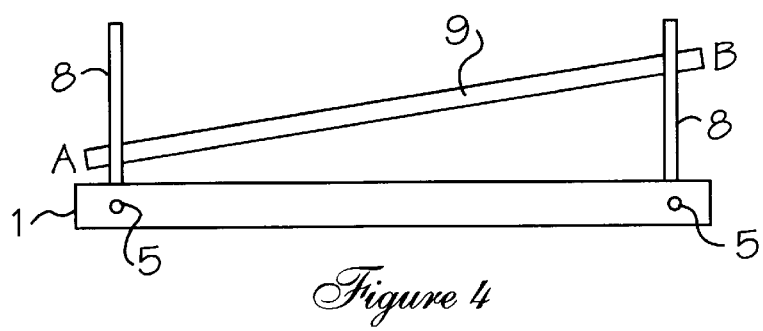
Figure 4
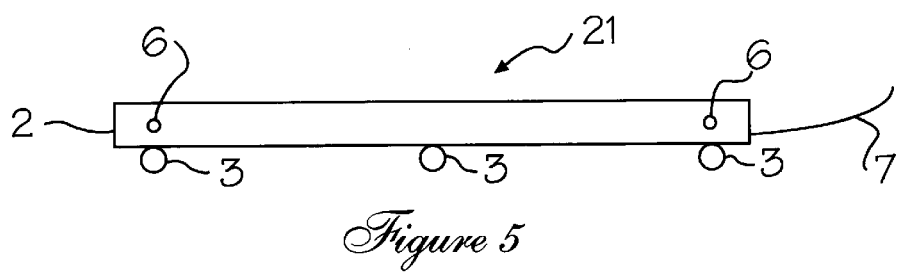
Figure 5

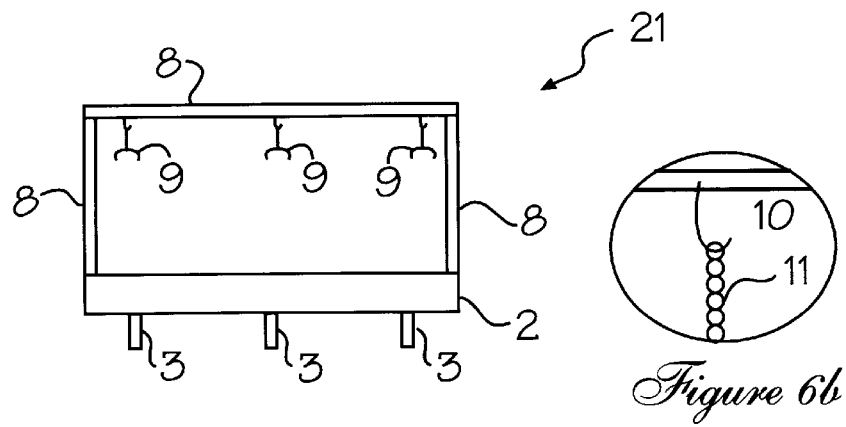
Figure 6a
Figure 6b
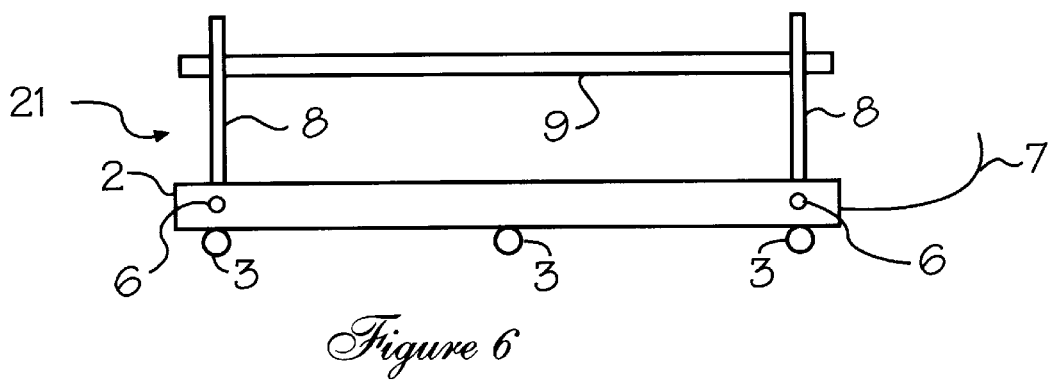
Figure 6
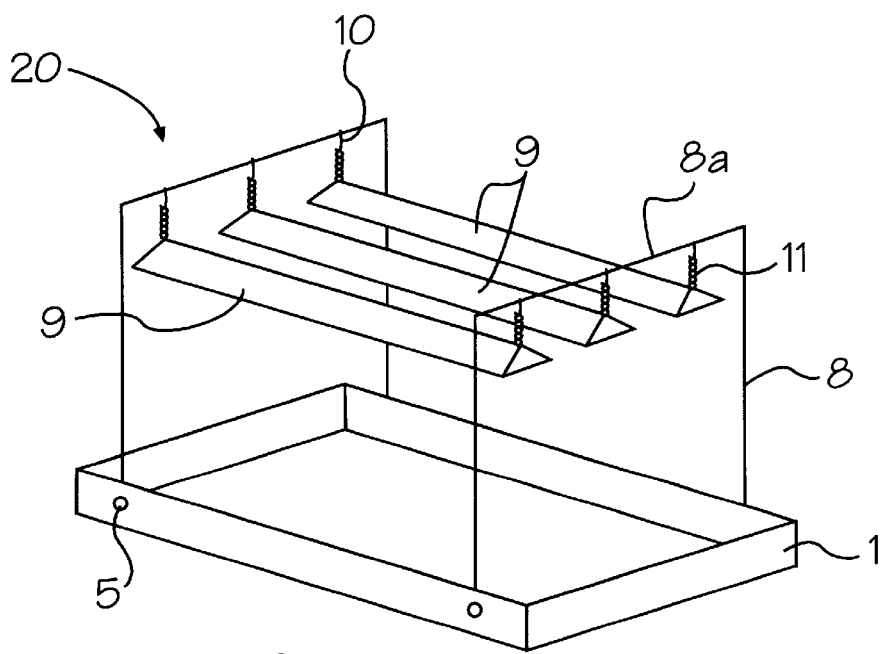
Figure 7

MULTI-COMPARTMENTALIZED PLANT CONTAINER

FIELD OF THE INVENTION

The present invention relates to plant containers and indoor plant propagation and, more particularly, to a multi-compartmentalized, integrated receptacle for transporting and nurturing plants.

BACKGROUND OF THE INVENTION

During the past three decades numerous devices have been developed to house and nurture plants using artificial lighting. Fluorescent lights in particular provide the proper wave lengths in the light spectrum that are conducive to plant development and growth. These lamps allow plants to be propagated indoors without the need for a greenhouse. The artificial lighting produces stronger and more vigorous plants that are available weeks before direct planting outdoors is possible. This ultimately results in higher crop yields, especially in those areas where the growing season is short.

Some indoor plant arrangements use vertical space with several illuminated shelves for gardening flats. These arrays save floor space in a typical residential dwelling, but are inherently unstable owing to their relatively high center of gravity. These shelves can easily be tipped over, causing great damage to the plants as well as to the containers in which they are housed.

Some current plant housing designs are deficient in providing the plants with an optimum environment for development. They lack adjustments for controlling the height above the gardening flats at which the light source(s) can be situated. Insufficient light will reach these plants, and poor development will result. Still other arrangements are not large enough to accommodate common heating elements used to warm the growing medium. These types of arrays cause decreased seed germination rates and stunted root development.

The present invention features a multi-compartmentalized unit for propagating, nurturing and transporting plants, as well as storing associated gardening tools and apparatus. The unit comprises a wheeled storage chest that opens into two sub-units. The bottom sub-unit serves as a utility cart for storing gardening tools and for transporting plants and/or other associated materials. The top sub-unit uses braces and adjustable lengths of chain to suspend a plurality of artificial light sources at the proper height above a plurality of gardening flats. The entire unit may be conveniently and easily wheeled into a closet for long term storage.

The present invention represents a substantial improvement over previous garden propagating devices. The unit of this invention has integrated compartments having the dual purposes of propagating plants and storing garden tools. The unit is designed as a storage chest on wheels. It is large enough to accommodate many of the implements traditionally used by gardeners. The top and bottom halves of the unit fit together securely using four chest latches. This configuration will comfortably store at least three full-sized (four feet) twin bulb fluorescent light fixtures, or grow-lights. As aforementioned, these lights can be suspended above gardening flats containing plants or seeds to provide an acceptable source of artificial light.

In addition, the unit will store a medium-sized propagation mat (22 inches×44 inches) and thermostat control. This control is used to warm the growing medium in one to four standard-sized, plastic gardening flats that are approximately 11 inches×22 inches. The entire apparatus necessary for suspending the grow-lights above the gardening flats is stored in the unit.

SUMMARY OF THE INVENTION

In accordance with the present invention, there is provided an integrated plant propagating and storage device. The device comprises a wheeled storage chest that opens to reveal two sub-units. The bottom sub-unit comprises a housing for accommodating a plurality of gardening flats. The bottom sub-unit also serves as a utility cart for storing gardening tools and for transporting plants and/or other associated materials. The top sub-unit provides a compartment that can be used with braces and adjustable lengths of chain to suspend a plurality of artificial light sources at the proper height above plant flats. The entire unit may be conveniently and easily assembled and disassembled. In its disassembled state, the device can be transported by use of its bottom, wheel-containing portion. In its mobile state, the plant device can be wheeled into a closet or other storage area for long term storage.

It is an object of this invention to provide an improved plant propagating device.

It is another object of the invention to provide a plant propagating and storage device in a single, integrated unit.

It is a further object of this invention to provide a multi-compartmentalized plant propagating and storage device that is mobile.

BRIEF DESCRIPTION OF THE DRAWINGS

A complete understanding of the present invention may be obtained by reference to the accompanying drawings, when considered in conjunction with the subsequent detailed description, in which:

FIG. 2b depicts an enlarged, schematic view of a portion of the assembled plant device shown in FIG. 2a;

FIG. 3 shows an enlarged, detailed side schematic view of the bracket assembly of the assembled plant device depicted in FIG. 2;

FIG. 3a shows a further enlarged, detailed view of a portion of the bracket assembly illustrated in FIG. 3;

FIG. 3b depicts a further enlarged, detailed view of another portion of the bracket assembly shown in FIG. 3;

FIG. 4 illustrates a schematic side view of the assembled plant device depicted in FIG. 2, in a height adjustment position;

FIG. 5 shows a side schematic view of a bottom portion of the plant device, depicted in FIG. 1;

FIG. 6 depicts a side schematic view of an alternate embodiment of the plant device shown in FIGS. 2 and 2a, wherein the device is assembled such that the transporting unit functions as a growth unit;

FIG. 6a illustrates a back schematic view of the plant device shown in FIG. 6;

FIG. 6b shows an enlarged view of a portion of the plant device depicted in FIG. 6a;

FIG. 7 depicts a schematic perspective view of the plant device illustrated in FIGS. 2, 2a and 2b.

For purposes of clarity and brevity, like elements and components will bear the same number or designation throughout the figures.

DESCRIPTION OF THE PREFERRED EMBODIMENT

Generally speaking, the invention features an integrated plant device that has at least one compartment for storing plant propagating equipment, for storing gardening tools, and for storing plant flats. The compartmentalized plant device assembles into a transportable storage chest on wheels. Thus, the unit provides both a storage and a mobile function.

Figure 1:
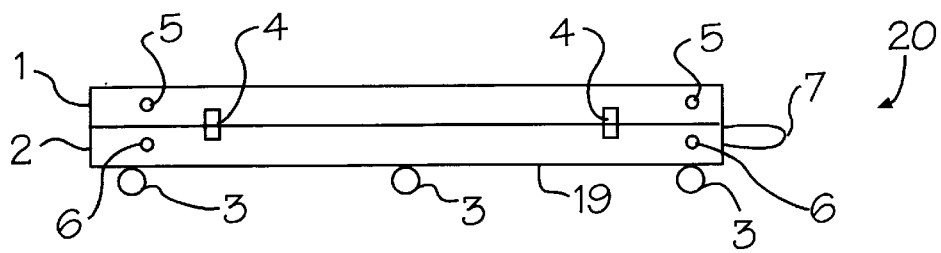
FIG. 1 illustrates a side schematic view of the plant device of this invention in an unassembled state.
Figure 1A:
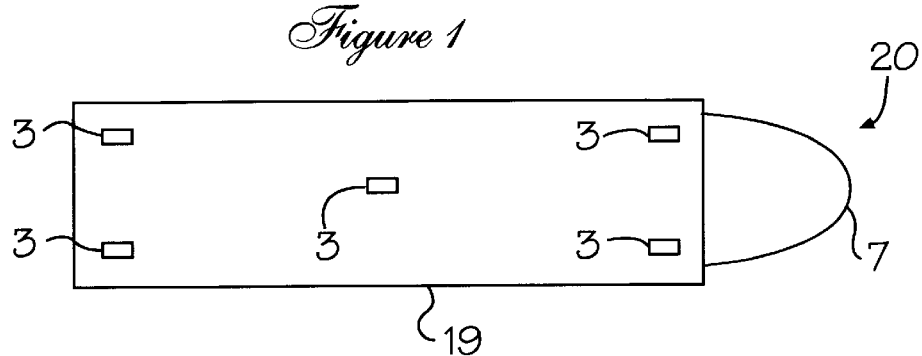
FIG. 1a depicts a bottom schematic view of the plant device shown in FIG. 1.

Referring to FIGS. 1 and 1a, a plant device 20 is schematically shown in its disassembled state. The unit consists of a top half compartment 1 and a bottom half compartment 2. The compartments 1 and 2 are respectively held together by chest latches 4. The unit 20 rests on swivel casters 3 disposed at the four corners and mid-portion of the undercarriage 19 of compartment 2. This wheel arrangement 3 allows the unit 20 to be moved about freely by using a pull cord 7. The pull cord 7 can be retracted into the bottom half compartment 2 by suitable means (not shown). Two sets of mounting holes 5 and 6, respectively, have been provided for added flexibility regarding the assembly and the hanging of fluorescent lamps 9 and the placement of brackets 17, as will be explained hereinafter.

The top compartment 1 and bottom compartment 2 are both preferably wood, which may be finished in a manner consistent with individual tastes. A water repellent coating is recommended, since the device will be exposed to moisture for prolonged periods. Alternative materials may also be used but should be of proper strength to execute the storage function and light enough to allow ease of maneuverability. Resistance to corrosion and/or rot are also of primary importance. The pull cord 7 can comprise any natural or synthetic fibrous rope material, such as cotton or nylon.

The respective compartments 1 and 2 are assembled identically in the preferred arrangement, using wood and wood screws to form shallow boxes which, when assembled, form an internal cavity that is deep enough to accommodate at least three grow-lights 9, a heating device 22 (FIG. 8), associated temperature and growth controls 23, including a temperature sensor 24, and hanging brackets 17 and chains 11 for suspending the grow-lights 9.

Figure 2A:
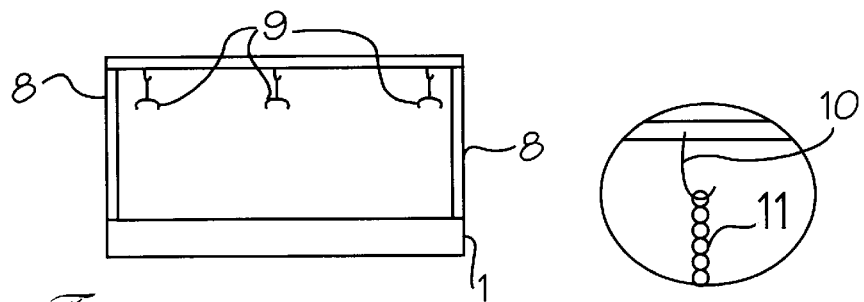
FIG. 2a illustrates a back schematic view of the assembled plant device shown in FIG. 2.
Figure 2B:
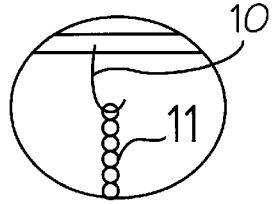
Figure 2:
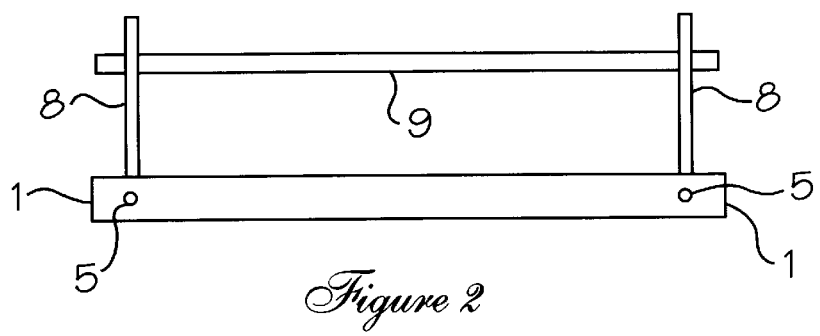
FIG. 2 shows a side schematic view of the assembled plant device illustrated in FIG. 1.

Referring to FIGS. 2, 2a, and 2b, a schematic view of the top compartment 1 of the storage unit 20 is shown. This compartment 1 will hereafter be referred to as the growth-unit. The shallow box comprising the dimensions of compartment 1 serves as an area where garden flats (not shown) can be placed for plant propagation. The pair of hanging brackets 17 depends from vertical and horizontal support bars 8, and are affixed to compartment 1 by appropriate fasteners, such as bolts 14, wing-nuts 15, and connecting plates 16 (FIGS. 3 and 3b), at designated mounting holes 5.

This method of mounting allows the growth-unit (compartment 1) to be assembled after the device 20 is initially opened, without the need for any tools. The back view in FIG. 2a illustrates how three sets of grow-lights 9, functioning as sources of artificial light, are suspended from the hanging brackets 17 using hooks 10 and adjustable length chains 11, as illustrated in FIG. 7.

The hanging brackets 17 are assembled in the preferred arrangement, shown in FIG. 3. The support bars 8 and one wood cross member 8a forms the hanging bracket 17. The cross members 8 and 8a receive a 90° metal brace 12 attached to the abutting corners of bars 8 and 8a, respectively (FIG. 3a). The brace 12 is secured by wood screws 13, as shown. Several hooks 10 are also installed along the underside 26 of the cross bar 8a, to accommodate suspension of grow-lights 9.

The length of the chain 11 suspending the fluorescent light sources 9 can be shortened or lengthened by altering the links of the chain 11 which hang from the hook 10, beneath the hanging bracket cross member 8a. This allows for many variations in light source positioning, one of which is shown in FIG. 4. FIG. 4 depicts chain 11 being lowered at position A to allow for a height differential between positions A and B.

The bottom compartment 2 of the device 20, hereafter referred to as the transporting unit 21, is illustrated in FIG. 5. The transporting unit 21 rests on the swivel casters 3, as aforementioned. The transporting unit 21 is maneuverable by reason of the swivelling of casters 3 and the force exerted upon the pull cord 7. As previously mentioned, the transporting unit 21 comprises a shallow box which helps prevent objects from sliding off during transport.

Figure 8:
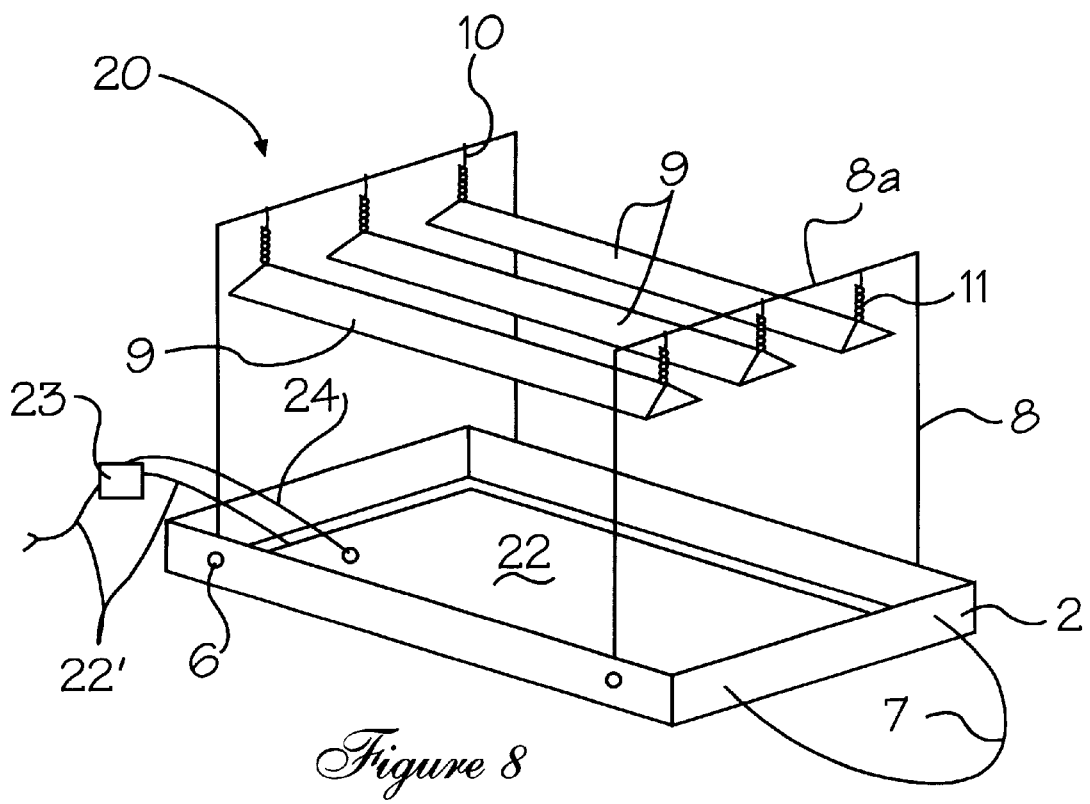
FIG. 8 depicts a schematic perspective view of the plant device illustrated in FIGS. 6, 6a and 6b.

In an alternative embodiment, as shown in FIGS. 6, 6a, 6b and 8, the hanging brackets 17 have been attached to the alternative mounting holes 6 of the transporting unit 21. Aside from improved mobility, this alternative arrangement is functionally identical to the preferred arrangement previously shown. An additional pair of hanging brackets 17 and grow-lights 9 could be employed, thereby allowing the unit to perform in both its intended and alternative embodiments (FIGS. 7 and 8).

Referring now again to FIG. 8, there is shown the plant device 20 having pull cord 7 attached thereto. Seated on bottom half compartment 2 is a heating unit 22 comprising an electric heating mat or coil, as is well known in the art. Attached to heating unit 22 are suitable electrical wires 22' for connecting the heating unit 22 to a source of power (e.g., house current or portable battery), not shown. A thermostat control or panel 23 is disposed between heating unit 22 and power source. Connected to the panel 23 is a temperature sensor 24, which regulates the temperature of the growing medium.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A multi-compartmentalized plant device having integrated compartments forming, in the assembled state, a plant propagating unit, and in the disassembled state forming a storage facility for garden paraphernalia, comprising a mobile, low profile storage chest whose integrated compartments fold together about an articulated connecting means in order to provide a substantially flattened low profile, said mobile storage chest having first and second compartments, respectively, said first and second compartments being separable about said articulated connecting means disposed therebetween, said first compartment comprising a first support for accommodating a plurality of gardening flats and a second support for suspending a plurality of artificial plant propagating light sources.

2. The multi-compartmentalized plant device having integrated compartments in accordance with claim 1, wherein said connecting means comprises at least one articulated member disposed about a seam separating said first and second compartments, respectively.

3. The multi-compartmentalized plant device having integrated compartments in accordance with claim 1, wherein said first compartment contains a box having a cavity for receiving and supporting said plurality of gardening flats.

4. The multi-compartmentalized plant device having integrated compartments in accordance with claim 1, further comprising a plurality of support members defining a frame for supporting a number of plant propagating lights, and means for attaching said plurality of support members to said first compartment.

5. The multi-compartmentalized plant device having integrated compartments in accordance with claim 4, wherein said frame for supporting a number of plant propagating lights has height adjustable means for varying the height at which said plant propagating lights can be suspended above said gardening flats.

6. The multi-compartmentalized plant device having integrated compartments in accordance with claim 5, wherein said adjustable means comprises flexible hanging supports.

7. The multi-compartmentalized plant device having integrated compartments in accordance with claim 5, further comprising hand adjustable fasteners, and wherein said frame is securable by said hand adjustable fasteners.

8. The multi-compartmentalized plant device having integrated compartments in accordance with claim 4, further comprising a control panel and a heating unit supported by said frame for adjusting temperature of said plurality of garden flats.

9. The multi-compartmentalized plant device having integrated compartments in accordance with claim 8, wherein said control panel and said heating unit comprise temperature sensing means for sensing temperature of said plurality of garden flats.

10. The multi-compartmentalized plant device having integrated compartments in accordance with claim 1, wherein said second compartment contains at least one caster for providing mobility for said plant device.

11. A multi-compartmentalized plant device having integrated compartments forming, in the assembled state, a plant propagating unit including a plurality of plant light propagating sources, comprising a mobile, low profile storage chest whose integrated compartments fold together about an articulated connecting means in order to provide a substantially flattened low profile, said mobile storage chest having first and second compartments, respectively, said first and second compartments being separable about said articulated connecting means disposed therebetween, said first compartment comprising a first support for accommodating a plurality of gardening flats and a second support for suspending said plurality of plant light propagating sources.

12. The multi-compartmentalized plant device having integrated compartments in accordance with claim 11, wherein said first compartment contains a box having a cavity for receiving and supporting said plurality of gardening flats.

13. The multi-compartmentalized plant device having integrated compartments in accordance with claim 11, further comprising a plurality of support members defining a frame for supporting a number of plant propagating lights, and means for attaching said plurality of support members to said first compartment.

14. The multi-compartmentalized plant device having integrated compartments in accordance with claim 13, wherein said frame for supporting a number of plant propagating lights has height adjustable means for varying the height at which said plant propagating lights can be suspended above said gardening flats.

15. The multi-compartmentalized plant device having integrated compartments in accordance with claim 14, further comprising hand adjustable fasteners, and wherein said frame is securable by said hand adjustable fasteners.

16. The multi-compartmentalized plant device having integrated compartments in accordance with claim 13, further comprising a control panel and a heating unit supported by said frame for adjusting temperature of said plurality of garden flats.

17. The multi-compartmentalized plant device having integrated compartments in accordance with claim 16, wherein said control panel and said heating unit comprise temperature sensing means for sensing temperature of said plurality of garden flats.

18. A mobile, plant device forming, in the assembled state, a plant propagating unit including a plurality of plant light propagating sources, comprising a mobile storage chest having integrated compartments that fold together about an articulated connecting means in order to provide a substantially flattened, low profile, said mobile storage chest having a first support for accommodating a plurality of gardening flats, a second support for suspending said plurality of plant light propagating sources, and at least one caster operatively connected to said plant propagating unit for movably supporting said mobile storage chest.

\* \* \* \* \*